Figure 1:
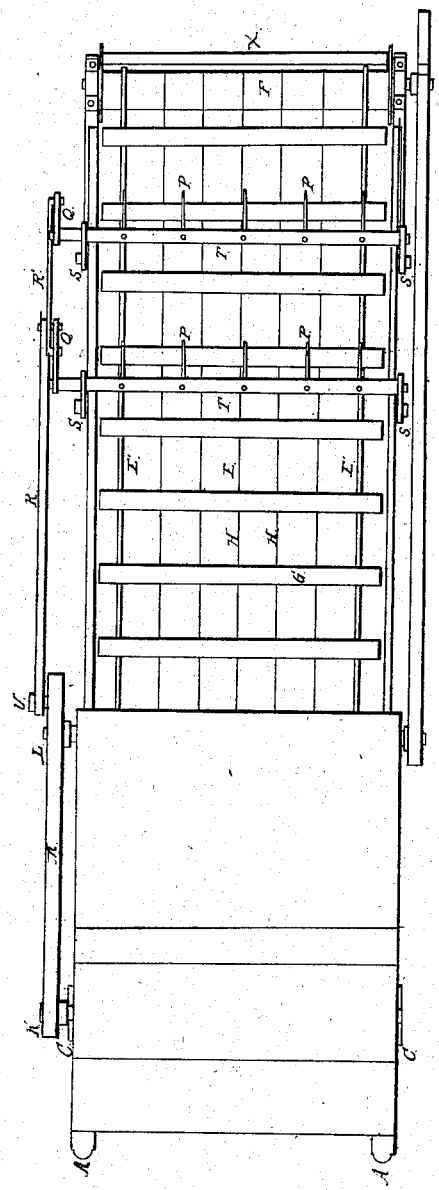

No. 33,148.

B. HOYLE, Jr. & A. RALSTON.
THRESHING MACHINE.

PATENTED AUG. 27, 1861.

Witnesses:

Inventors:

UNITED STATES PATENT OFFICE.

BENJAMIN HOYLE, JR., AND ANDERSON RALSTON, OF MARTINS FERRY, OHIO.

THRESHING-MACHINE.

Specification of Letters Patent No. 33,148, dated August 27, 1861.

*To all whom it may concern:*

Be it known that we, BENJAMIN HOYLE, Jr., and ANDERSON RALSTON, both of Martins Ferry, in the county of Belmont and State of Ohio, have invented certain new and useful Improvements in Agitators for Straw-Carriers on Threshing-Machines; and we do hereby declare that the same are described and represented in the following specifications and drawings.

To enable others skilled in the art to make and use our improvements we will proceed to describe their construction and operation referring to the drawings in which the same letters indicate like parts in each of the figures.

Figure 2:
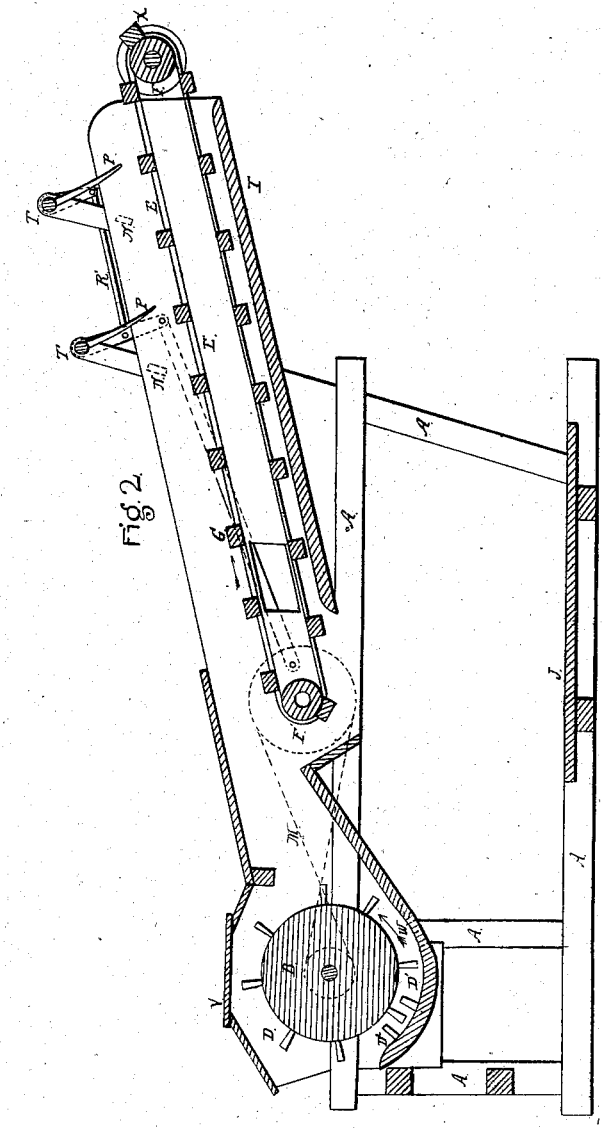

Figure 1. is a plan or top view of a threshing machine with our improvements. Fig. 2 is a sectional elevation through the center of Fig. 1 longitudinally.

The nature of our improvement consists in arranging over an endless band straw carrier, of a threshing machine, one or more rock shafts with radial tines or fingers which are vibrated to agitate the straw on the carrier and shake out the grain, while the straw is being conveyed on the straw carrier.

In the accompanying drawings, some parts of the machine, which are not necessary to show the connection of our improvements are omitted.

(A A) is the frame of a threshing machine and straw carrier; which frame may be made in the form represented, or of such other configuration as may answer the purpose.

(B) is the threshing cylinder, having its shaft mounted in bearings (C,) on the frame (A). This cylinder (B) is provided with spikes or teeth (D,) and is made to revolve rapidly by means of a belt and pulley or otherwise.

(D') is a fixed concave, furnished with spikes or teeth (D²,) and is placed below the cylinder (B,).

The straw carrier (E) consists of two or more endless parallel straps (E') passing around the drum (F) and drum or independent pulleys (F'); to these straps, at suitable distances apart, are attached a number of transverse bars or slats G, each bar or slat being provided with a suitable number of holes, into which are inserted the cords (H, H,) running parallel with said straps. A carrier thus constructed constitutes what is technically termed an "open carrier". We do not limit ourselves, however, to this peculiar form of carrier, as it is obvious that by a slight modification, any other form of carrier, embodying the principle of an endless revolving belt, may be substituted therefor—as, for instance, by extending the bottom (I) under the drum (F) an endless apron of canvas, or other suitable material, furnished with transverse bars or strips may be used.

(I) is the return bottom, upon which the grain discharged from the carrier (E) is conducted to the place of deposit (J). Motion is communicated to the straw carrier (E) by means of the pulleys (K) and (L) and strap (M). The standards (S S) are provided with adjusting slots (N), and are fitted to the sides of the trunk, as represented in the drawings, and support the shafts (T T). These shafts (T T) between their supports (S S) are furnished with any suitable number of tines or fingers (P), and at one end each is provided with an arm (Q) by means of which, and the connecting rods (R) and (R') and crank (U) or their equivalent. The tines or fingers (P) are made to vibrate in any desired arc of a circle. In the drawings, the shafts (T T) are represented as placed above the endless belt carrier (E) and parallel to its axis of revolution. We do not confine ourselves, however, to this particular arrangement, as it is obvious that said shafts (T T) may be placed at any angle to the axis of the carrier's revolution, without essentially changing the principle of construction and operation; though it is probable that their action would be thereby rendered somewhat less efficient.

(V) represents the cap or casing over the threshing cylinder; (W) the under casing or chute. The motions of the various parts being indicated by the directions of the respective arrows, their motions and connections will be understood by an inspection of the drawings.

The threshing is effected by passing the unthreshed grain between the teeth or spikes of the rapidly rotating cylinder (B), and those of the fixed concave (D). The force generated by the revolution of the cylinder (B) throws the grain and straw over the chute (W), at the termination of which there is a space, through which a portion of the grain is precipitated, while the straw, with the remaining grain is thrown upon the endless straw carrier (E) a further portion of the grain passing through its meshes, and falling upon the return bottom (I), while the straw is carried on the slats and cords to the place of discharge (X). The straw in its progress on the carrier (E) is operated upon by the tines or fingers (P) of shafts (T T) the form and peculiar vibratory motion of which check, shake and toss the straw in such a way as effectually to separate the remaining grain therefrom. The grain thus disengaged then passes through the meshes of the "open carrier" (E) upon the return bottom (I) whence it slides, or is conveyed by the return motion of the slats (G) of the carrier (E) to the place of deposit (J) where it, together with the grain previously separated, if desired, may be immediately cleaned by any of the cleaning apparatus now used.

The above operation is predicated upon the use of an "open carrier." Should an endless apron of canvas, or other suitable material, provided with transverse bars or strips, be substituted, the grain disengaged from the straw will fall between said bars or strips, upon the apron, and will be discharged upon the bottom (I) under the drum (F) whence it will be conveyed to the place of deposit (J) by the same means as that separated by the meshes of the open "carrier" above described. We do not confine ourselves to either form of carrier, neither do we limit ourselves to any relative speed of carrier (E) and vibrating shafts (T T), but in practice generally gear so that the crank (U) shall make about three revolutions to one of the carrier drums (F F').

We believe we have described and represented our improvements in agitators for straw carriers on threshing machines, so as to enable any person skilled in the art to make and use them. We will now state what we claim and desire to secure by Letters Patent, to wit,

We claim—

In combination with an endless belt straw carrier of a threshing machine, one or more rock shafts with radial tines or fingers, arranged above the straw carrier, and operated substantially as described, to agitate the straw on the carrier and shake out the grain.

BENJAMIN HOYLE, JR.
ANDERSON RALSTON.

Witnesses:
WM. WALLACE,
ELLIS J. HOYLE.